July 19, 1960  J. D. RUSSELL  2,945,939
ROTARY WELDING ELECTRODES
Filed March 13, 1958  2 Sheets-Sheet 1
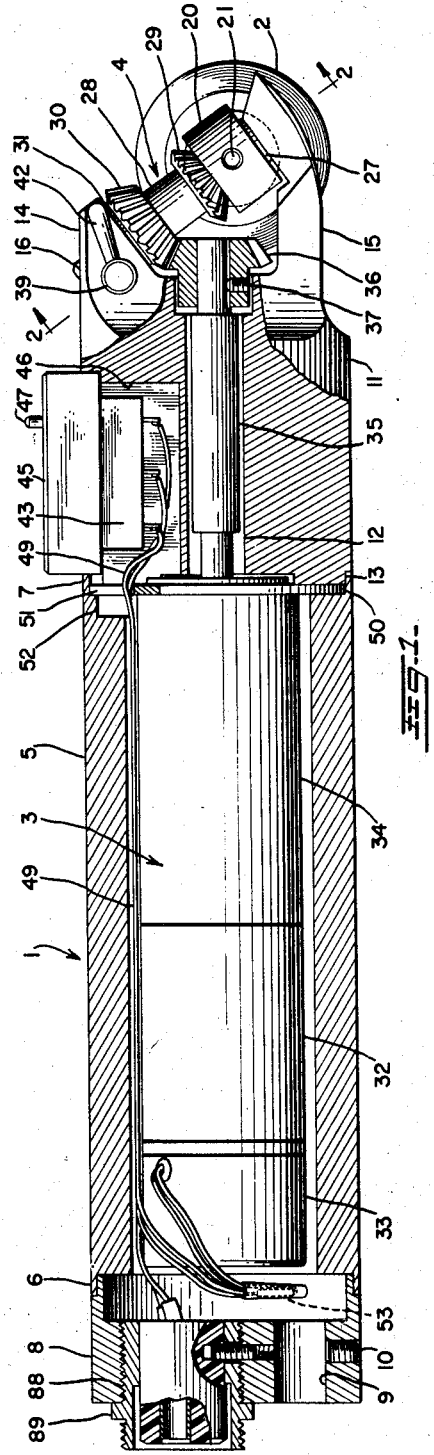
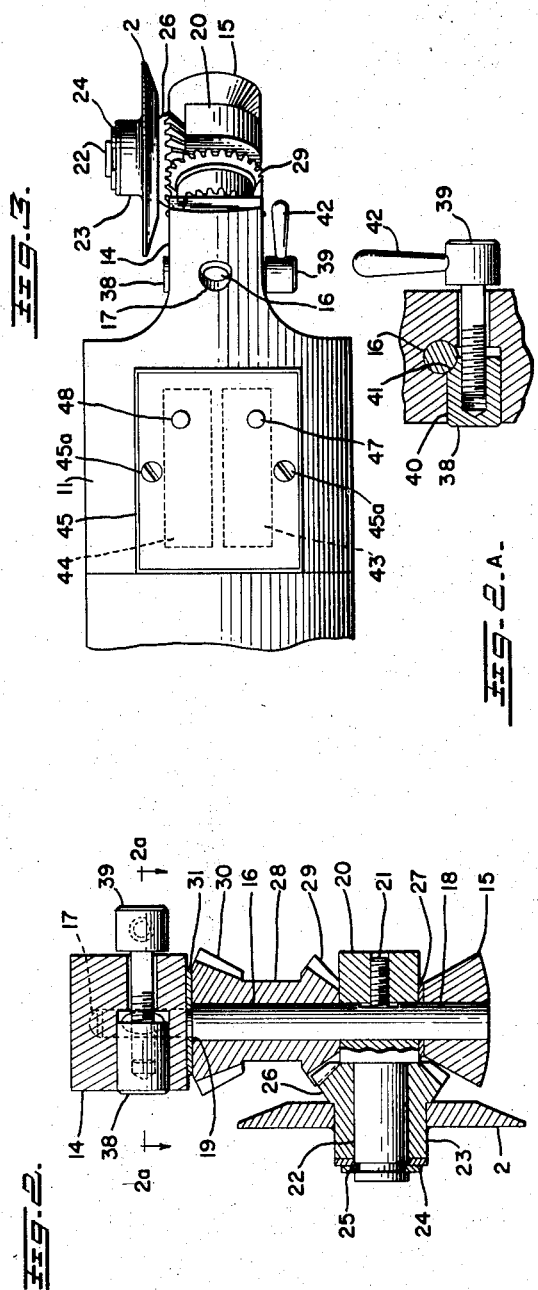
INVENTOR.
JOHN D. RUSSELL
BY
Charles J. Elderkin
ATTORNEY July 19, 1960  J. D. RUSSELL  2,945,939
ROTARY WELDING ELECTRODES
Filed March 13, 1958  2 Sheets-Sheet 2

INVENTOR.
JOHN D. RUSSELL
BY
Charles J. Elderkin
ATTORNEY

United States Patent Office 2,945,939
Patented July 19, 1960

2,945,939

ROTARY WELDING ELECTRODES

John D. Russell, 6830 Alta Loma Terrace,
Hollywood, Calif.

Filed Mar. 13, 1958, Ser. No. 721,256

4 Claims. (Cl. 219—82)

This invention relates to welding apparatus and particularly to a novel, hand-guided, roller type welding electrode unit for electrical resistance welders.

In many welding applications, it is desirable to employ a hand-manipulated electrode unit of such nature that the welding electrode is guided along the work entirely by the operator. This is true, for example, in the welding of very thin metal strain gage units to a member to be tested. In such instances, considerable difficulty has been encountered because the operator is not sufficiently skilled to travel the electrode along the work at the optimum speed. Another obstacle has been the fact that the particular configuration of the work, and the varied manners in which the work parts may be arranged, frequently make it difficult for the operator to keep the electrode properly engaged with the work.

A primary object of the invention is to devise a hand-guided, power driven, roller type welding electrode unit which, in operation, moves along the work surface at a substantially constant, predetermined speed independent of the skill and judgment of the operator.

Another object is to provide such a device, including a work-engaging roller and a manipulating handle therefor, the roller being so mounted on the handle that the axis of the roller can be adjusted to any of a plurality of operating positions to increase the maneuverability of the unit and hence its scope of use. A further object is to provide such a device in which the operator can secure the roller in any such adjusted position.

Yet another object is to provide, in combination with an electrode unit of the type described, a novel form of electrode providing the advantages of a simple disc or roller electrode, yet capable of being advanced to a point immediately adjacent to a surface blocking the welding path, such novel electrode also serving to predetermine the length of the weld. In this connection, this embodiment of the invention is particularly useful in welding a work piece of given length to a surface, the novel electrode being of such configuration as to preclude or minimize the possibility that the electrode will run off the work piece and directly contact, and thus possibly mar, the surface.

Another object is to provide a hand-guided, roller type welding electrode unit embodying novel means to control the welding current supply means, with which the unit is used, in such fashion as to assure proper spacing between spot welds made by the unit.

In order that the manner in which these and other objects are attained in accordance with the invention can be understood in detail, reference is had to the accompanying drawings, which form a part of this specification, and wherein:

Fig. 1 is a longitudinal sectional view of a welding electrode unit constructed in accordance with one embodiment of the invention, some parts being shown in elevation;

Fig. 2 is a transverse sectional view taken on line 2—2, Fig. 1;

Figure 6:
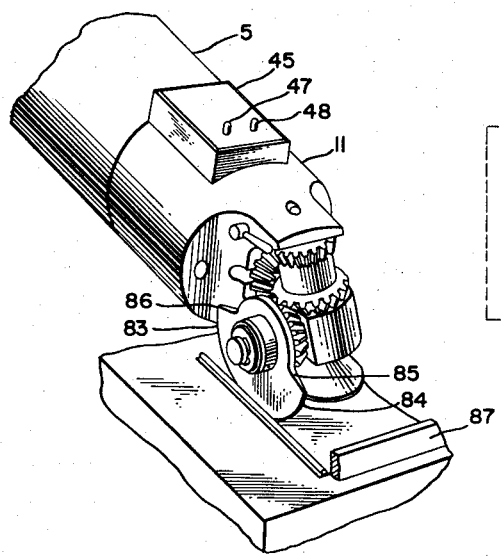
Figure 4:
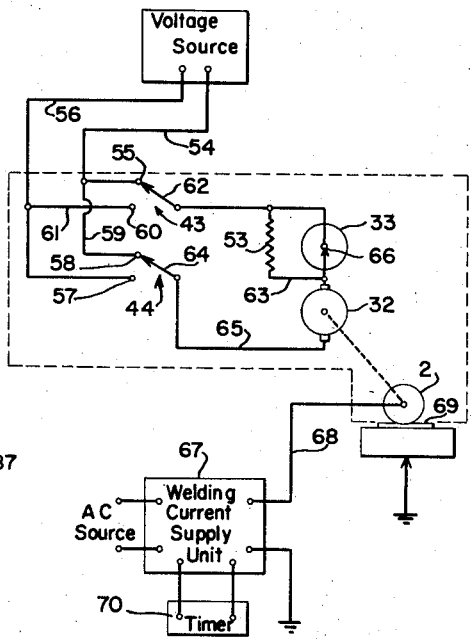
Figure 5:
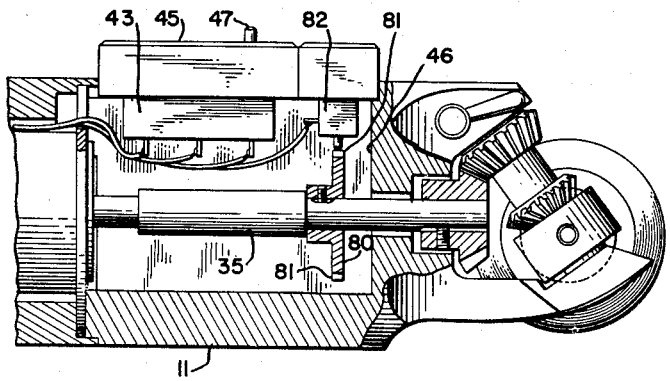

Fig. 2ª is a transverse sectional view taken on line 2ª—2ª, Fig. 2;

Fig. 3 is a fragmentary plan view of the device of Fig. 1;

Fig. 4 is a schematic circuit diagram of the device of Fig. 1 and its associated electrical equipment;

Fig. 5 is a partial longitudinal sectional view, similar to Fig. 1, but illustrating a modified embodiment; and Fig. 6 is a fragmentary view in perspective illustrating the manner in which the device of Fig. 1 is employed, and also showing a modified form of roller therefor.

Referring now to the drawings in detail, it will be seen that the embodiment of the invention shown in Figs. 1–3 comprises a combination housing and handle, indicated generally at 1, a traction roller 2 which also constitutes the welding electrode of the unit, power means 3 for driving roller 2, and gearing, indicated generally at 4, connecting the power means to the roller.

Housing 1 includes a cylindrical tubular metal member 5 having end portions of larger inner diameter, providing lips at 6, 7. One end of member 5 is closed by a cup-shaped cap 8, the cylindrical wall of which is received telescopically within lip 7, cap 8 being secured to member 5 in any suitable manner, as by screws (not shown). Cap 8 is provided with a small bore 9 extending axially of the housing and adapted to receive a welding current supply lead (not shown), so that welding current is supplied to member 5 and all electrically conductive parts of the unit connected thereto. The supply lead is retained in bore 9 by a set screw 10.

At its other end, member 5 is closed by a roller mount or head 11 having a central bore 12 extending axially with respect to member 5. At one end, head 11 has a portion 13, of reduced outer diameter, embraced by lip 6 of member 5. Head 11 is secured to member 5 by a plurality of elongated screws extending therethrough parallel to bore 12 and engaged in appropriate threaded bores in the wall of member 5. At its forward end, head 11 has formed integrally therewith a pair of projections 14, 15 spaced one on each side of the longitudinal axis of the unit and extending parallel to said axis. Projection 15 is longer than projection 14 and, at its tip, is cut away to provide an end surface curing inwardly toward the longitudinal axis of the unit.

A shaft 16 extends between, and has its end portions journaled respectively in, projections 14, 15, the axis of shaft 16 being angularly disposed with respect to the longitudinal axis of the unit and intersecting the same. Thus, projection 14 is provided with a forwardly and inwardly slanting bore 17 receiving one end of shaft 16, while projection 15 is provided with a rearwardly and inwardly slanting bore 18 receiving the other end of shaft 16, the two bores being aligned coaxially. Bore 17 is of smaller diameter, and the corresponding end portion of shaft 16 is of reduced diameter, so that the shaft can be inserted through bore 18 into bore 17, there being a shoulder 19 on the shaft which abuts projection 14 to determine the final position of the shaft.

Carried by shaft 16 at a point adjacent projection 15 is a stub shaft mounting block 20 fixed to the shaft, as by a set screw 21. A stub shaft 22 is formed integrally with block 20 and extends radially outward with respect to shaft 16. Rotatable on shaft 22 is a sleeve 23, held in place on shaft 22 by a snap ring 24 engaged in a transverse annular slot 25 in the free end of the shaft. A disc-shaped electrode roller 2 is brazed to the central portion of sleeve 23 in such fashion that the axis of shaft 22 is normal to the plane of the roller. Immediately adjacent the roller, on the side thereof facing block 20, a bevel gear 26 is formed integrally with sleeve 23.

A spacing washer 27 is carried by shaft 16 between block 20 and projection 15. When shaft 16 is free to rotate relative to the two projections in which it is journaled, roller 2 can be adjusted about the axis of shaft 16 from a position adjacent one side of the projections to a position adjacent the other side of the projections.

Rotatably mounted on shaft 16 between stub shaft mounting block 20 and projection 14 is a sleeve 28 having at one end an integrally formed bevel gear 29, operatively engaged with gear 26, and at the other end an integrally formed bevel gear 30. Bevel gear 30 abuts a spacing washer 31 carried by shaft 16 between shoulder 19 and projection 14. Sleeve 28, and its gears 29, 30, are free to rotate with respect to shaft 16 and thus with respect to block 20 and shaft 22.

Power means 3 comprises an electrical motor 32 equipped with a governor 3 and connected to drive a speed reduction gearing unit 34. Reduction gearing unit 34 has its output shaft 35 extending through and slightly beyond central bore 12 of mount or head 11. Mounted on the free end of output shaft 35 is a bevel gear 36 fixed to the shaft, as by a set screw 37. Gear 36 is operatively engaged with gear 31 on sleeve 28. Accordingly, when motor 32 is in operation, roller 2 is rotated, about the axis of stub shaft 22, through gears 36, 30, 29 and 26, assuming that shaft 16 is held stationary.

In order to secure shaft 16 in any adjusted position, there is provided a locking means comprising a lock element 38 adapted to be brought into locking engagement with shaft 16 by operation of an actuating screw 39. Lock element 38 is slidably disposed, generally at one side of shaft 16, in a bore 40 which extends through projection 14 transversely of shaft 16 and is displaced slightly inwardly therefrom, so that bore 40 communicates with bore 17. The end of element 38 facing shaft 16 is provided with a bevelled portion 41 for engagement with the shaft. Actuating screw 39 has a portion of larger diameter, located outside of bore 40 at one side of projection 14, and a threaded portion of smaller diameter, extending through bore 40, past shaft 16, and into engagement with an appropriate threaded bore in lock element 38. Thus, when screw 39 is turned in one direction, lock element 38 is brought into locking engagement with shaft 16 to prevent rotation thereof, while turning screw 39 in the opposite direction causes lock element to be moved away from shaft 16, freeing the same for rotation relative to projection 14. In this connection, bevelled portion 41 is always closely adjacent shaft 16, so that lock element 38 is held against rotation because the bevelled portion thereof engages the shaft. To accomplish rotation of screw 39, there is provided a small hand lever 42 fixed to the actuating screw at a point beside projection 14.

Mount or head 11 also carries a pair of manually actuated switches 43, 44 carried within a mounting member 45 disposed within a recess 46 in head 11. Member 45 is secured to head 11 in any suitable fashion, as by screws 45ª. Switches 43, 44 are equipped with push-button type actuators 47, 48, respectively, extending above the surface of mounting member 45 and therefore readily accessible for actuation by the same hand holding handle 1. Beneath member 45, switches 43, 44 are provided with soldering lugs to which the necessary electrical leads, indicated generally at 49, are connected.

Power means 3 is fixed in place by a circular flange 50 secured to the casing for reduction gearing 34 and also to the forward end portion of tubular member 5 as by screws (not shown). Flange 50 is provided with a notch 51 communicating between recess 46, on the one hand, and a recess 52 in the inner wall of member 5. The electrical leads 49 extend from switches 43, 44 through notch 51 and recess 52 and then between the inner wall of member 5 and the power means 3, for connection to the motor and governor. An insulated resistor 53 is connected in one of the leads for association with the governor, as later explained.

As seen in the schematic diagram of Fig. 4, the motor 32 is connected to a suitable voltage source via a circuit comprising conductor 54, connected to the normally-closed contact 55 of switch 43, and a conductor 56 connected to the normally-open contact 57 of switch 44. Normally-closed contact 55 of switch 43 is connected to normally-closed contact 58 of switch 44 by conductor 59. Normally-open contact 60 of switch 43 and normally-open contact 57 of switch 44 are connected together by conductor 61. Movable contact 62 of switch 43 is connected, in series with resistor 53, to one side of motor 32 by conductor 63. The other side of motor 32 is connected to movable contact 64 of switch 44 via conductor 65.

The governor 33 comprises a normally-closed centrifugal switch 66 connected in parallel with resistor 53, as shown. Thus, so long as the speed of motor 32 is below a predetermined value, and switch 66 therefore closed, resistor 53 is short-circuited. When the speed of the motor exceeds such predetermined value, however, centrifugal switch 66 opens, connecting the resistor 53 in series with the motor to reduce the speed thereof.

The electrode roller 2 is connected to the welding current supply 67 via conductor 68, the conductive portions of housing 1, shaft 16, shaft 22 and flange 23, the metal workpiece 69 and ground. In this embodiment, the welding current supply 67 is of the condenser type and includes a timer 70 operatively connected thereto to establish an intermittent supply of welding current to roller 2.

Thus, as motor 32 drives the electrode roller to travel the same along the workpiece, a periodic welding current is applied to the work through the roller and spot welding is accordingly accomplished, with the spacing between the spot welds being determined by the speed of rotation imparted to the roller electrode by the motor and reduction gearing. Motor 32 is a D.C. motor, reversible by reversing the direction of current flow thereto. Thus, the motor operates in one direction when switch 43 is actuated and in the reverse direction when switch 44 is actuated. Accordingly, when dealing with a relatively short workpiece, as in the case of a strain gage housing, a first weld line can be made by actuating switch 43 to cause roller 2 to be driven in one direction, then manually relocating the roller on the workpiece, and then actuating switch 44 to cause the roller to be rotated in the opposite direction. The welding electrode unit is placed with the roller in engagement with the workpiece, and is guided, during production of the welds, entirely by one hand in the manner which will be clear from Fig. 6.

It will be understood that the motor 32 is of the miniature type and that gear reduction unit 34 provides a relatively high reduction, on the order of 6,000:1, so that rotation of the electrode roller may be considered to be fairly slow. The electrode roller 2 has a relatively sharp peripheral edge and is capable of such frictional engagement with the work, under light pressures applied manually, that the roller functions as an effective traction member to travel the entire unit along the workpiece, so that the operator need only guide the unit in the proper direction and maintain the proper pressure on the electrode. Since governor 33 serves to maintain a substantially constant running speed for motor 32, the operator need give no attention to the rate at which the unit advances along the workpiece.

Fig. 5 shows a modified form of the invention wherein timing means for the welding current supply is embodied directly in the electrode unit. The construction is essentially the same as illustrated in Fig. 1, except that head 11 is made hollow, adjacent member 5, to accommodate a rotary cam 80 secured to shaft 35 and provided with a plurality of cam lobes 81. Rearwardly of switches 43, 44, in recess 46 in head 11, there is provided in this embodiment an additional switch 82 with its actuating member disposed for successful engagement with the lobes 81 of cam 80 as the cam is rotated by shaft 35. Thus, as the roller electrode 2 is rotated, the switch 82 is cyclically operated in timed relation therewith. Switch 82 is connected to control the welding current supply 67 in any conventional fashion. Thus, with the welding current supply being of the condenser type, the switch 82 is connected to actuate a relay having contacts arranged to make and break the welding current supply circuit directly. It will thus be understood that the pulses of welding current established by cyclic actuation of switch 82 are in timed relation to the rotation of roller 2, since both the roller and the switch-operating cam are rotated by the same shaft.

In addition to illustrating the manner in which the operator manipulates the electrode unit, Fig. 6 discloses a modified form of electrode roller indicated at 83. This form can be referred to as a sector type electrode, being a disc-like element with a work-engaging surface 84 extending for only a segment of a circle, the radial dimension of the roller in all portions thereof not embraced by surface 84 being substantially reduced, as indicated at 85. The particular form of electrode roller shown in Fig. 6 has two advantages. First, the circumferential dimension of work-engaging portion 84 can be made equal to the length of the weld desired. Then, considering point 86 on the portion 84 as being the starting point, it will be understood that the roller automatically measures the length of the weld. Welding of small lengths of metal can thus be done more speedily, or entrusted to a less skilled operator, since the particular configuration of the welding electrode 83 substantially relieves the operator of the burden of gauging the length of the weld.

Next, the particular form of electrode roller 83 allows a weld line to be carried into close proximity to an obstruction 87 lying in the path of the weld. It will thus be understood that if a full-circle roller, of the type shown in Fig. 1, were employed, the periphery of the roller would engage the obstruction at a time when the point of engagement between the roller and the workpiece is considerably removed from the obstruction. Again assuming that the weld was started with point 86 of sector roller 83 in engagement with the work, it will be clear that the portion of the roller embraced by work-engaging surface 84 will be rotated in such fashion that the roller will not engage obstruction 87 before the weld is completed.

Tubular member 5 of combined housing and handle 1 is provided with a threaded bore 88 to accommodate a female electrical connector 89 via which the supply conductors 54, 56 are connected to the unit.

I claim:

1. A hand-guided welding electrode unit comprising a hollow handle; an electrode mounting head secured to one end of said handle; electrical motor means mounted in said handle and having an output shaft extending through said mounting head; a shaft mounted in said head, the axis of said shaft being angularly disposed with respect to the axis of said output shaft; gear means carried by said shaft and rotatable about the axis thereof; a gear secured to said output shaft, and engaging said gear means to cause said gear means to rotate about the axis of said shaft; bearing means mounted on said shaft and rotatable about the axis thereof; a roller type electrode rotatably mounted on said bearing means; and a gear secured to said electrode and operatively engaged with said gear means.

2. A hand-guided welding electrode unit in accordance with claim 1 and wherein said bearing means is fixed to said shaft, said shaft being rotatable about its axis, and said apparatus further comprising a locking means operative to prevent rotation of said shaft about its axis.

3. A hand-guided welding electrode unit comprising an elongated housing; electrical motor means mounted in said housing and having an output shaft extending to the exterior of said housing at one end thereof, said housing having at least one projection extending from said one end in the direction of the axis of said shaft, said projection having a width substantially less than the width of said housing; a second shaft carried by said projection, the axis of said second shaft being angularly disposed with respect to the axis of said output shaft; gear means carried by said second shaft and rotatable about the axis thereof, a gear secured to said output shaft and operatively engaging said gear means; bearing means mounted on said second shaft and rotatable about the axis thereof, a traction roller rotatably mounted on said bearing means; and a gear connected to said traction roller and operatively engaged with said gear means, said motor means and gear means being effective to drive said roller rotatably about an axis established by said bearing means, and said roller being swingably adjustable about the axis of said second shaft.

4. A hand-guided welding electrode unit comprising an elongated handle; a rotary power shaft carried by said handle and extending to the exterior of said handle at one end thereof, said handle having at least one projection extending from said one end in the direction of the axis of said shaft, said projection having a width substantially less than the width of said handle; a second shaft carried by said projection, the axis of said second shaft being angularly disposed with respect to the axis of said power shaft; a traction roller mounted on said bearing means for rotation about said radially extending axis, said roller being spaced from the axis of said second shaft to such an extent that said roller is capable of occupying either a first position adjacent one side of said projection or a second position adjacent the other side of said projection, said roller and bearing means being swingably adjustable about the axis of said second shaft to allow movement of said roller between said first and second position; and gear means operatively connected to said traction roller and said output shaft to drive said roller rotatably about the radially directed axis established by said bearing means, in any such adjusted position of said roller and bearing means.

References Cited in the file of this patent

UNITED STATES PATENTS

| | | |
|---|---|---|
| 444,928 | Thomson | Jan. 20, 1891 |
| 1,101,448 | Jones | June 23, 1914 |
| 2,263,038 | Heim | Nov. 18, 1941 |
| 2,297,473 | Heim | Sept. 29, 1942 |
| 2,397,646 | Brown | Apr. 2, 1946 |